US007236597B2

(12) United States Patent
Elliott et al.

(10) Patent No.: US 7,236,597 B2
(45) Date of Patent: Jun. 26, 2007

(54) KEY TRANSPORT IN QUANTUM CRYPTOGRAPHIC NETWORKS

(75) Inventors: Brig Barnum Elliott, Arlington, MA (US); David Spencer Pearson, Bennington, VT (US)

(73) Assignee: BBN Technologies Corp., Cambridge, MA (US)

( * ) Notice: Subject to any disclaimer, the term of this patent is extended or adjusted under 35 U.S.C. 154(b) by 713 days.

(21) Appl. No.: 10/324,040

(22) Filed: Dec. 20, 2002

(65) Prior Publication Data

US 2004/0120528 A1 Jun. 24, 2004

(51) Int. Cl.
*H04L 9/08* (2006.01)

(52) U.S. Cl. .................. 380/263; 380/256; 380/277
(58) Field of Classification Search .............. None
See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 4,770,535 A | 9/1988 | Kim et al. | |
| 5,058,973 A | 10/1991 | Refregier et al. | |
| 5,243,649 A | 9/1993 | Franson | 380/9 |
| 5,307,410 A * | 4/1994 | Bennett | 380/256 |
| 5,311,572 A | 5/1994 | Friedes et al. | |
| 5,339,182 A | 8/1994 | Kimble et al. | 359/112 |
| 5,400,325 A | 3/1995 | Chatwani et al. | |
| 5,414,771 A | 5/1995 | Fawcett, Jr. | 380/44 |
| 5,469,432 A | 11/1995 | Gat | |
| 5,502,766 A | 3/1996 | Boebert et al. | 380/25 |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | 380/21 |
| 5,710,773 A | 1/1998 | Shiga | |
| 5,729,608 A | 3/1998 | Janson et al. | |

(Continued)

OTHER PUBLICATIONS

"Quantum k y distribution: Real-time compensation of interferometer phase drift," NTNU Department of Physical Electronics, pp. 1-45.

(Continued)

*Primary Examiner*—Taghi T. Arani
*Assistant Examiner*—Saoussen Besrour
(74) *Attorney, Agent, or Firm*—Fish & Neave IP Group Ropes & Gray LLP (57) ABSTRACT

Methods, apparatus, and systems are provided for distributing a key between nodes. The nodes are provided separate links for carrying messages versus keying information or material. The links for carrying messages couple the nodes to a messaging network, such as the Internet. In addition, the nodes are coupled together in a key distribution network by specialized links for carrying keying information or material. The links for keying information or material are configured to ensure the security of the keying information or material. The nodes that neighbor each other in the key distribution network establish respective pairwise keys. Once the pairwise keys are established, a set of non-neighboring nodes establish a shared key by communicating a sequence of bits through the messaging network. In order to ensure the security of the sequence of bits, the sequence of bits is encrypted based on the respective pairwise keys of neighboring nodes as it is forwarded in messages through the messaging network.

23 Claims, 4 Drawing Sheets

U.S. PATENT DOCUMENTS

| | | | |
|---|---|---|---|
| 5,732,139 A | 3/1998 | Lo et al. ...................... 380/28 |
| 5,757,912 A | 5/1998 | Blow ........................... 380/21 |
| 5,764,765 A | 6/1998 | Phoenix et al. ............... 380/21 |
| 5,764,767 A | 6/1998 | Beimel et al. |
| 5,768,378 A | 6/1998 | Townsend et al. ............ 380/21 |
| 5,768,391 A | 6/1998 | Ichikawa ..................... 380/49 |
| 5,805,801 A | 9/1998 | Holloway et al. |
| 5,850,441 A | 12/1998 | Townsend et al. ............ 380/21 |
| 5,911,018 A | 6/1999 | Bischel et al. |
| 5,953,421 A | 9/1999 | Townsend .................... 380/21 |
| 5,960,131 A | 9/1999 | Fouquet et al. |
| 5,960,133 A | 9/1999 | Tomlinson |
| 5,966,224 A | 10/1999 | Hughes et al. .............. 359/162 |
| 6,005,993 A | 12/1999 | MacDonald |
| 6,028,935 A | 2/2000 | Rarity et al. |
| 6,052,465 A | 4/2000 | Gotoh et al. |
| 6,097,696 A | 8/2000 | Doverspike |
| 6,122,252 A | 9/2000 | Aimoto et al. |
| 6,130,780 A | 10/2000 | Joannopoulos et al. |
| 6,145,024 A | 11/2000 | Maezawa et al. |
| 6,154,586 A | 11/2000 | MacDonald et al. |
| 6,160,651 A | 12/2000 | Chang et al. |
| 6,188,768 B1 | 2/2001 | Bethune et al. |
| 6,233,075 B1 | 5/2001 | Chang et al. |
| 6,233,393 B1 | 5/2001 | Yanagihara et al. |
| 6,289,104 B1 | 9/2001 | Patterson et al. |
| 6,341,127 B1 | 1/2002 | Katsube et al. |
| 6,378,072 B1 | 4/2002 | Collins et al. |
| 6,463,060 B1 | 10/2002 | Sato et al. |
| 6,507,012 B1 | 1/2003 | Medard et al. |
| 6,519,062 B1 | 2/2003 | Yoo |
| 6,529,498 B1 | 3/2003 | Cheng |
| 6,532,543 B1 | 3/2003 | Smith et al. |
| 6,538,990 B1 | 3/2003 | Prorock |
| 6,539,410 B1 | 3/2003 | Klass |
| 6,560,707 B2 | 5/2003 | Curtis et al. |
| 6,563,796 B1 | 5/2003 | Saito |
| 6,594,055 B2 | 7/2003 | Snawerdt |
| 6,605,822 B1 | 8/2003 | Blais et al. |
| 6,646,727 B2 | 11/2003 | Saleh et al. |
| 6,647,010 B1 | 11/2003 | Ford et al. |
| 6,654,346 B1 | 11/2003 | Mahalingaiah et al. |
| 6,678,379 B1 | 1/2004 | Mayers et al. |
| 6,684,335 B1 | 1/2004 | Epstein et al. |
| 6,728,281 B1 | 4/2004 | Santori et al. |
| 6,748,434 B2 | 6/2004 | Kavanagh |
| 6,754,214 B1 | 6/2004 | Mahalingaiah |
| 6,778,557 B1 | 8/2004 | Yuki et al. |
| 6,799,270 B1* | 9/2004 | Bull et al. ................... 713/153 |
| 6,801,626 B1 | 10/2004 | Nambu |
| 6,836,463 B2 | 12/2004 | Garcia-Luna-Aceves et al. |
| 6,862,564 B1 | 3/2005 | Shue et al. |
| 6,882,431 B2 | 4/2005 | Teich et al. |
| 6,895,092 B2 | 5/2005 | Tomita |
| 6,897,434 B1 | 5/2005 | Kumar et al. |
| 6,986,056 B1 | 1/2006 | Dultz et al. |
| 7,035,411 B2 | 4/2006 | Azuma et al. |
| 2002/0025041 A1 | 2/2002 | Tomita |
| 2002/0097874 A1 | 7/2002 | Foden et al. |
| 2002/0141019 A1 | 10/2002 | Chang et al. |
| 2003/0002074 A1 | 1/2003 | Nambu et al. |
| 2003/0002674 A1 | 1/2003 | Nambu et al. |
| 2003/0059157 A1 | 3/2003 | DeCusalis et al. |
| 2003/0231771 A1 | 12/2003 | Gisin et al. |
| 2004/0005056 A1 | 1/2004 | Nishioka et al. |
| 2004/0008843 A1 | 1/2004 | Van Enk |
| 2004/0019676 A1 | 1/2004 | Iwatsuki et al. |
| 2004/0165884 A1 | 8/2004 | Al-Chalabi |
| 2004/0184603 A1* | 9/2004 | Pearson et al. ............... 380/28 |
| 2004/0190725 A1 | 9/2004 | Yuan et al. |

OTHER PUBLICATIONS

Awduche, D.O., et al., "Multi-Protocol Lambda Switching: Combining MPLS Traffic Engineering Control With Optical Crossconnects," Internet Draft (Jan. 2001).

Basak, D., et al., "Multi-protocol Lambda Switching: Issues in Combining MPLS Traffic Engineering Control With Optical Cross-connects," Internet draft (Aug. 2000).

Bennett, C.H., et al., "Generalized Privacy Amplification," IBM Research, 24 pages (May 31, 1995).

Bethune, D.S., et al., "An Autocompentsating Fiber-Optic Quantum Cryptography System Based on Polarization Splitting of Light," IEEE Journal of Quantum Electronics, XX(Y):100-108 (1999).

Bethune, D.S., et al., "Prototype Autocompensating Quantum Cryptography System Based on Polarization Splitting of Light," Session QC41—Quantum Computing and Cryptograph, Oral session, Wednesday morning, Mar. 24, 1999, Liberty Room, Omni Hotel.

Brassard, G., et al., "Cryptology Column—25 Years of Quantum Cryptography," Pragocrypt, pp. 13-24 (Jul. 1996).

Brassard, G., et al., "Secret-Key Reconciliation by Public Discussion," Department IRO, Universite de Montreal, 14 pages (1994).

Cabello, A., "Multiparty key distribution and secret sharing based on entanglement swapping," pp. 1-8, (Sep. 7, 2000).

Crepeau, C., et al., "Secure Multi-party Quantum Computation," ACM, pp. 1-10 (2001).

Eisenburg, S., "Lucent Technologies names Cherry Murray physical sciences research vice president," Press Release (Mar. 28, 2000).

Ekert, A.K., "Quantum Cryptography Based on Bell's Theorem," Physical Review Letters, 67(6):661-663 (1991).

Elliott, B.B., et al., "Path-length control in a interferometric QKD link," Proc. of SPIE, vol. #5101, 11 pages (Apr. 21, 2003).

Elliott, C., "Building the quantum network," New J. Phys., 4:46 (2002).

Franson, J.D., "Bell Inequality for Position and Time," Physical Review Letters, 62(19):2205-2208 (1989).

Gisin, N., et al., "Quantum cryptography and long distance Bell experiments: How to control decoherence," Geneva, Switzerland, pp. 1-7 and 4 pages of drawings (Jan. 15, 1999).

Gisin, N., et al., "Quantum cryptography," Reviews of Modern Physics, 74:145-184 (2002).

Gottesman, D., et al., "Secure quantum key distribution using squeezed states," pp. 1-19 (Sep. 25, 2000).

Jennewein, T., et al., "Quantum Cryptography with Entangled Photons," Physical Review Letters, 84(20):4729-4732 (2000).

Lin, L.Y., et al., "Free-Space Micromachined Optical Switches for Optical Networking," IEEE Journal of Selected Topics in Quantum Electronics, 5(1):4-9 (1999).

Maurer, U., et al., "Information-Theoretic Key Agreement: From Weak to Strong Secrecy for Free," Computer Science Department, Swiss Federal Institute of Technology, 20 pages (2000).

Maurer, U.M., "Secret Key Agreement by Public Discussion From Common Information," IEEE Transactions on Information Theory, 39:733-742 (1993).

Mo, X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhui.

Naik, D.S., et al., "Entangled State Quantum Cryptography: Eavesdropping on the Ekert Protocol," Physical Review Letters, 84(20):4733-4736 (2000).

Ribordy, G., et al., "Long-distance entanglement-based quantum key distribution," Physical Review A, vol. 63, 012309-1-012309-12 (2001).

Rosen, E., et al., "Multiprotocol Label Switching Architecture," MPLS Architecture, 1-61 (Jan. 2001).

Scarani, V., et al., "Quantum Cryptography Protocols Robust Against Photon Number Splitting Attacks for Weak Lazer Implementations," Physical Review Letters, 92(5):057901-1 through 057901-4 (Feb. 2004).

Scarani, V., et al., "Quantum cryptography protocols robust against photon number splitting attacks," ERATO Conference on Quantum Information Science 2003, Sep. 4-6, 2003, Niijimakaikan, Kyoto Japan; 2 pages.

Schneier, B., "Applied Cryptography," Second Edition, Chapter 10, Oct. 18, 1995, Wiley & Sons Publ., pp. 216-220.

Slutsky, B., et al., "Defense frontier analysis of quantum cryptographic systems," Applied Optics, 37(14):2869-2878 (1998).

Tanzilli, S., et al., "PPLN waveguide for quantum communication," Eur. Phys. J.D., 18:155-160 (2002).

Tittel, W., et al., "Long-distance Bell-type tests using energy-time entangled photons," Physical Review A, 59(6):4150-4163 (1999).

Walker, J.A., "Telecommunications Applications of MEMS," mstnews, pp. 6-9 (Mar. 2000).

Xiao, L., et al., "Efficient Multi-Party Quantum Secret Sharing Schemes," pp. 1-7 (May 28, 2004).

Bowers, J.E., "Optical Network and Component Trends," UCSB, NSF Workshop, 51 pages.

Honjo, T., et al., "Differential-phase-shift Quantum Key Distribution," NTT Technical Review, 2(12):26-33 (Dec. 2004).

Nambu, Y., et al., "BB84 Quantum Key Distribution System based on Silica-Based Planar Lightwave Circuits," Fundamental and Environmental Research Laboratories and Fiber Optic Devices Division, pp. 1-11.

Paniccia, M., "Silicon Integrated Photonics," UCSB, 30 pages, Feb. 2, 2005.

Tomita, A., et al., "Recent Progress in Quantum Key Transmission," NEC J. of Adv. Tech., 2(1):84-91 (Winter 2005).

Lakshman et al., High Speed Policy-based Packet Forwarding Using Efficient Multi-dimensional Range Matching. Proceedings of the ACM SIGCOMM'98 conference on Applications, technologies, architectures and protocols for computer communication. pp. 203-214 (1998).

Garcia-Lunes-Aceves et al. Scalable Link-State Internet Routing. Network Protocols. (1998).

Estrin et al. Security Issues in Policy Routing. 1989 IEEE, pp. 183-193.

Lampson et al. IP Lookups Using Multiway and Multicolumn Search. IEEE/ACM Transactions on Networking. 7:3 (1999).

Garcia-Luna-Aceves et al. Distributed, Scalable Routing Based on Vectors of Link State. IEEE Journal on Selected Areas in Communications. 13:8, 1383-95 (1995).

Tsai, et al. An Adaptive Hierarchical Routing Protocol. IEEE Transactions on Computers. 38:8, 1059-75 (1989).

Ramanathan et al. Hierarchically-organized, multihop mobile wireless networks for quality-of-service support. Mobile Networks and Applications. pp. 101-119 (1998).

Degermark et al. Small Forwarding Tables of Fast Routing Lookups. ACM. pp. 3-14 (1997).

Waldvogel et al. Scalable High Speed IP Routing Lookups. ACM. pp. 25-36 (1997).

Violations of a New Inequality for Classical Fields; Fransom, J.D.; Johns Hopkins Univerity; NTIS-NASA Publication; Goddard Space Flight Center; Workshop on Squeezed States and Uncertainty Relations, Feb. 1991, pp. 23-32.

Quantum Cryptography Defies Eavesdropping: Collins, Gary; Physics Today; Nov. 1992; pp. 21-23.

Quantum Public Key Distribution System; IBM Technical Disclosure Bulletin; vol. 28, No. 7; pp. 3151-3163; Dec. 1985.

Single Photon Interference in 10 km Long Optical Fibre Interferometer; P.D. Townsend et al.; Electronics Letters; vol. 29, No. 7; pp. 634-635; Apr. 1, 1993.

Enhanced Single Photon Fringe Visibility in A 10 km Long Prototype Quantum Cryptography Channel; P.D. Townsend et al.; Electronics Letters; vol. 29, No. 14; pp. 1291-1293; Jul. 1993.

Secure Key Distribution System Based on Quantum Cryptography; P.D. Townsend; Electronics Letters; vol. 30, No. 10; pp. 809-811; May 12, 1994.

Multi-User Quantum Cryptography on Optical Networks; Simon J.D. Phoenix et al.; vol. 42, No. 6; pp. 1155-1163; Jun. 1995.

Charles H. Bennett et al., Experimental Quantum Cryprography, Journal of Cryptology's special issue after Eurocrypt '90, Sep. 1991, 28 pages.

Charles H. Bennett et al., Quantum Cryptography, Public Key Distribution and Coin Tossing, Intl. Conf. On Computers, Systems & Signal Processing, Bangalore, India, Dec. 10-12, 1984, 5 pages.

D. Stucki et al., Quantum Key Distribution over 67 km with a plug&play system, New Journal of Physics 4 (2002) 41.1-41.8.

Bennett, C.H., "Quantum Cryptography Using Any Two Nonorthogonal States," Physical Review Letters, 68(21):3121-3124 (1992).

Bennett, C.H., et al., "Experimental Quantum Cryptography," J. Cryptology, 5:3-28 (1992).

Butler, W.T., et al. "Free space quantum-key distribution," Physical Review A, 57(4):2379-2382 (Apr. 1998).

Jacobs, B.C., et al., "Quantum cryptography in free space," Optics Letters, 21(22):1854-1856 (Nov. 1996).

Bethune, D.S., et al., An Autocompensating Fiber-Optic Quantum Cryptography System Based on Polarization Splitting of Light, IEEE Journal of Quantum Electronics, 36(3):340-347 (2000).

* cited by examiner

KEY TRANSPORT IN QUANTUM CRYPTOGRAPHIC NETWORKS

STATEMENT REGARDING FEDERALLY SPONSORED RESEARCH OR DEVELOPMENT

This invention was made with Government support under Contract No. F30602-01-C-0170, awarded by the Defense Advanced Research Project Agency ("DARPA"). The Government has certain rights in this invention.

CROSS-REFERENCE TO RELATED APPLICATIONS

The instant patent application is related to co-pending U.S. patent application Ser. No. 09/611,783, entitled "SYSTEMS AND METHODS FOR IMPLEMENTING QUANTUM CRYPTOGRAPHIC COMMUNICATIONS NETWORK," filed on Jul. 7, 2000, having assignee in common with that of the instant patent application, and being incorporated herein by reference in its entirety.

DESCRIPTION OF THE INVENTION

1. Field of the Invention

The present invention relates to distributing key material between nodes coupled to a network using quantum cryptographic techniques.

2. Background of the Invention

Cryptography is the science of securing information by rendering it unreadable to everyone except the intended recipient of the information. Information that has been cryptographically rendered unreadable may be described as "encrypted," and conversely, unreadable information that is unscrambled and again rendered into readable form may be described as "decrypted." In modern cryptography, the algorithms used for encrypting and decrypting information employ at least one piece of information commonly called a "key." For example, some algorithms may employ a single key for both encrypting and decrypting information, while other algorithms may employ separate keys for encrypting and decrypting information.

There are two general types of key-based algorithms: symmetric and public-key. Symmetric algorithms are algorithms where the encryption key can be calculated from the decryption key and vice versa. In most symmetric algorithms, the encryption key and decryption key are the same. These algorithms are known as secret-key algorithms or single-key algorithms and require that a sender and receiver agree on at least one key before they can communicate secured information.

Public-key algorithms use different keys for encryption and decryption. The encryption key is often made public, such that any sender may use the encryption key to encrypt information and send a message to a receiver. However, the encrypted information in the message can only be decrypted by the intended receiver that uses a specific decryption key (also known as the private key). The decryption key is mathematically related to the encryption key, but cannot be easily calculated from the encryption key. For example, the well known RSA public-key algorithm uses public keys and private keys, which are based on a factoring a pair of large prime numbers. Since factoring large numbers is difficult, the private key is difficult to calculate even if the public key is known.

Both symmetric and public-key algorithms require the secure distribution of keys. In particular, symmetric algorithms require that both the sender and receiver securely exchange at least one key. Likewise, although public-key algorithms allow one key to be publicly disclosed, the private key must still be securely distributed.

Ideally, a key distribution system delivers keys fast enough to ensure that any sender or receiver does not exhaust their supply. In order to increase security, most key-based algorithms change keys, for example, based on a time interval or amount of data that has been encrypted by the current key. In addition, a key distribution system should be able to distribute keys over a large distance to a variety of locations and around any single points of failure in the system.

One method of securely distributing keys is to physically deliver a key, for example, using a secure courier. Another method uses an electronic medium, such as a secure or private network, to deliver a key. Unfortunately, most known methods of distributing keys are subject to attack. For example, an eavesdropper may intercept keys as they are being physically delivered or use various equipment to tap into the electronic medium of a key distribution system. Moreover, these attacks may be accomplished without the knowledge of the sender and receiver.

Accordingly, it would be desirable to provide methods, apparatus, and systems which overcome these and other shortcomings of the prior art.

SUMMARY OF THE INVENTION

In accordance with one aspect of the invention, methods and systems are provided to establish a key using a plurality of nodes. Each node is coupled to a first network and a second network. Nodes that neighbor each other in the second network establish respective keys. A first node then determines a sequence of bits. The sequence of bits is communicated through the first network to a second node along at least one path traversing a set of the plurality of nodes based on the respective keys established for the nodes in the set. A key that is shared between the first node and the second node is then determined based on the sequence of bits.

In accordance with another aspect of the present invention, a node comprises a first interface, a second interface, and a processor. The first interface is coupled to a first network. The second interface is coupled to at least one additional node. The processor is configured to determine a first key that is shared with the at least one additional node based on information exchanged through the second interface, determine a sequence of bits, and determine a result based on combining the sequence of bits with at least a portion of the first key. The processor is also configured to send the result in a message to the additional node through the first network via the first interface, and determine a second key that is shared with a second node based on the sequence of bits.

In accordance with another aspect of the present invention, a node coupled to a network comprises a first interface, a second interface, a memory, and at least one processor. The first interface is coupled to the network. The second interface is coupled to a first node in the network through a link. The link substantially maintains a quantum state of photons in light information conveyed between the node and the first node. Based on code stored in the memory, one or more processors may determine a first key that is shared with the first node based on the light information conveyed through the link and determine a sequence of bits. The one or more processors may then send the sequence of bits through the first node to at least one additional node coupled to the network based on the first key and determine a second key that is shared with the at least one additional node based on the sequence of bits.

In accordance with another aspect of the present invention, a node comprises a first interface coupled to a first network, a second interface coupled to a first neighboring node, a third interface coupled to a second neighboring node, and a processor. The processor is configured to establish respective keys shared with the first neighboring node and second neighboring node, receive a first message that is routed from the first neighboring node through the first network, and identify a sequence of bits in the first message based on the respective key shared with the first neighboring node. The processor then identifies whether the sequence of bits is to be used for a key that is shared between a set of other nodes coupled to the first network. In addition, the processor is configured to determine a result based on combining the sequence of bits with at least a portion of the respective key shared with the second neighboring node and forward the result in a second message that is routed through the first network to the second neighboring node.

In accordance with another aspect of the present invention, a system distributes a sequence of bits to be used as a key that is shared between a first node and a second node. The system comprises a first network for exchanging messages and a second network for exchanging keys. A set of nodes are coupled to the first network and the second network. Nodes that neighbor each other in the second network establish respective keys. The nodes are configured to then communicate the sequence of bits from the first node to the second node through the first network based on the respective keys established through the second network.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Methods, apparatus, and systems are provided for distributing key information or material between nodes. The nodes are provided separate links for carrying messages versus keying information, such as key material. The links for carrying messages couple the nodes to a messaging network, such as the Internet. In addition, the nodes are coupled together in a key distribution network by specialized links for carrying keying information or material. The links for keying information or material are configured to ensure the security of the keying information or material. For example, the links for keying information or material may be optical links configured as quantum cryptographic links that substantially maintain the quantum state of photons in the light conveyed through the link.

The nodes that neighbor each other in the key distribution network establish respective pairwise keys. Once the pairwise keys are established, a set of non-neighboring nodes then establish a shared key. The non-neighboring nodes establish the shared key by communicating key information or material, such as a sequence of bits, through the messaging network and traversing one or more intermediate nodes. To ensure the security of the sequence of bits, the sequence of bits is encrypted based on the respective pairwise keys of neighboring nodes as it is forwarded in messages through the messaging network.

Reference will now be made in detail to the exemplary embodiments of the invention, examples of which are illustrated in the accompanying drawings. Wherever possible, the same reference numbers will be used throughout the drawings to refer to the same or like parts.

Figure 1:
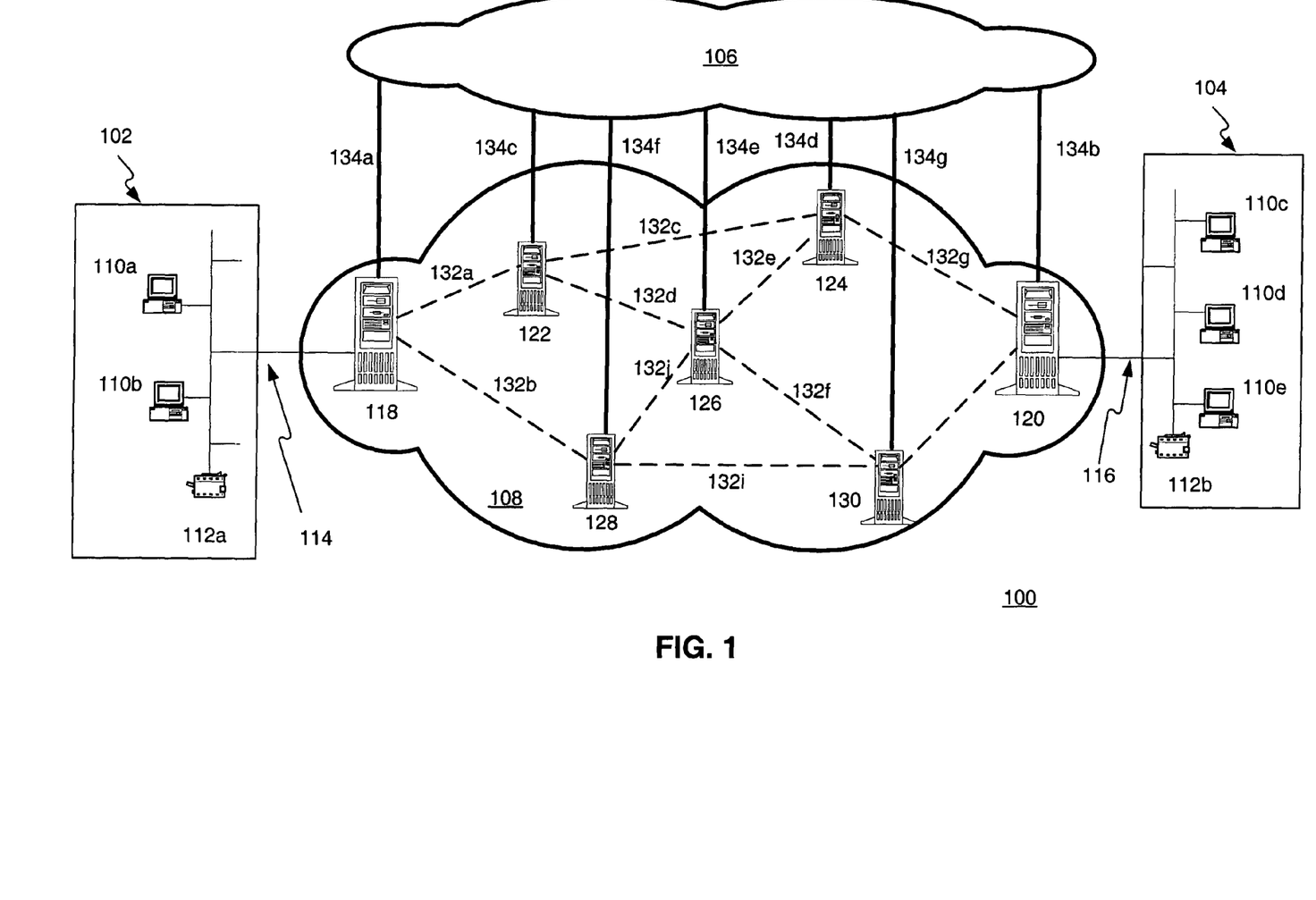
FIG. 1 illustrates a system consistent with the principles of the present invention.

FIG. 1 illustrates a system 100 consistent with the principles of the present invention. As shown, system 100 comprises a first enclave 102, a second enclave 104, a network 106, and a key distribution network 108.

First enclave 102 and second enclave 104 may be a node, a device, such as a personal computer, or a plurality of devices or nodes coupled together by a network. For example, as shown, first enclave 102 and second enclave 104 may include a local area network, such as an Ethernet network, that interconnects a group of devices such as personal computers 110a–b, 110c–e, and printers 112a, and 112b, respectively. First enclave 102 and second enclave 104 may include other types of devices not shown, such as laptop computers, servers, firewalls, or personal digital assistants. First enclave 102 may also include other types of networks, such as a wide area network or a wireless network.

In order to communicate externally, first enclave 102 and second enclave 104 include links 114 and 116, respectively. Links 114 and 116 may be any type of wireline or wireless connection path that allows communications with another node, such as nodes 118 and 120. For example, links 114 and 116 may be an Ethernet link or a wired transmission link, such as a "T-1" digital transmission link to nodes 118 and 120, respectively. Although links 114 and 116 are shown as single connections paths, links 114 and 116 may also be implemented using a combination of connections paths.

Key distribution network 108 provides a communications infrastructure for sharing key information or material between nodes 118, 120, 122, 124, 126, 128, and 130. Node 118 is coupled to link 114 and serves as a gateway between network 106, key distribution network 108, and first enclave 108. Node 120 is coupled to link 116 and serves as a gateway between network 106, key distribution network 108, and second enclave 104. Nodes 118 and 120 may perform a variety of functions. For example, node 118 may translate protocols to allow information, such as a frame, packet, or cell, to be communicated between network 106 and private enclave 102. Nodes 118 and 120 may support a variety of known protocols, such as the Internet Protocol, Asynchronous Transfer Mode, Frame Relay, and Ethernet.

Nodes 118 and 120 may also provide a variety of security features, such as filtering, authentication, and encryption. For example, nodes 118 and 120 may implement the protocols for "IPSec." RFC-2401, R. Atkinson, The Internet Society (1998), titled "Security Architecture for IP," describes, inter alia, IPSec and is incorporated herein by reference in its entirety. As described in RFC-2401, IPSec supports encryption and provides protocols for exchanging and negotiating keys.

Accordingly, to provide a secure communications medium for exchanging keys and keying information or material, system 100 includes key distribution network 108 that comprises links interconnecting nodes 118, 120, 122, 124, 126, 128, and 130. Although key distribution network 108 may be used to support IPSec, key distribution network 108 provides a communications infrastructure for any type of key, key information or material, or key management protocol.

Within key distribution network 108, nodes 118, 120, 122, 124, 126, 128, and 130 are coupled by links 132a–j, respectively. In order to enhance the security of key distribution network 108, in one embodiment, links 132a–j may be implemented as quantum cryptographic links that convey light. Quantum cryptographic links provide security based on the principles of quantum mechanics of light. According to quantum mechanic principles, photons within light cannot be measured without affecting their quantum state. Therefore, if an eavesdropper attempts to tap into a quantum cryptographic link, the eavesdropper will noticeably affect the quantum state of photons conveyed through that link and may be detected using the known quantum cryptographic protocols.

Links 132a–j may be implemented, for example, on a dedicated or separate fiber optic link, or channels of a fiber optic link, such as a fiber optic link that supports Dense Wave Division Multiplexing or any other type of suitable transmission scheme. Links 132a–j may be implemented in conventional optical fiber, hollow-core fiber, fiber made of photonic bandgap material, free space propagation through the atmosphere, free space propagation through outerspace, propagation through water, or any other type of transmissive material. Links 132a–j may include a plurality of devices that are capable of forwarding light without altering the quantum state of photons in the light, such as switches having Micro-Electro-Mechanical Systems ("MEMS") mirror arrays. Any link that is capable of substantially maintaining the quantum state of photons in light as it is conveyed may be used as a quantum cryptographic link.

Although quantum cryptographic links may be implemented throughout key distribution networks 108, other techniques may be used to enhance security alone or in conjunction with quantum cryptographic techniques. For example, key distribution network 108 may be implemented using private dedicated fiber optic links.

By exchanging light information, such as light pulses, through links 132a–j, nodes 118, 120, 122, 124, 126, 128, and 130 can establish pairwise keys with respective neighboring nodes. For example, node 118 establishes pairwise keys with nodes 122 and 128. Node 120 establishes pairwise keys with nodes 124 and 130. Node 122 establishes pairwise keys with nodes 118, 124, and 126. Node 124 establishes pairwise keys with nodes 120, 122, and 126. Node 126 establishes pairwise keys with nodes 122, 124, 128, and 130. Node 128 establishes pairwise keys with nodes 118, 126, and 130. Node 130 establishes pairwise keys with nodes 120, 126, and 128.

The pairwise keys between neighboring nodes may be various lengths, such as 32, 64, 128, 256 bits, or more. In addition, nodes 118, 120, 122, 124, 126, 128, and 130 may exchange multiple pairwise keys or key materials for encrypting different types of traffic. For example, nodes 118 and 122 may exchange a first pairwise key of 128 bits for messages considered normal traffic and exchange a second pairwise key of 256 bits for messages considered highly confidential traffic.

Nodes 118, 120, 122, 124, 126, 128, and 130 are also coupled to network 106 via links 134a–g, respectively. Links 134a–g provide a connection path to network 106 and may be implemented using known wireline or wireless technologies. For example, links 134a–g may be implemented as a wired transmission link, such as a "T-1" digital transmission link, a digital signal level 3 ("DS-3"), or synchronous optical network ("SONET") link. In addition, links 134a–g may comprise one or more network elements, such as a router, switch, or hub. Accordingly, nodes 118,120, 122,124,126,128, and 130 may exchange messages with each other through network 106 via links 134a–g.

Nodes 118, 120, 122, 124, 126, 128, and 130 are implemented using known platforms of hardware and software. For example, nodes 118, 120, 122, 124, 126, 128, and 130 may be implemented using one or more devices, such as a router, switch, firewall, computer, or server. In addition, nodes 118, 120, 122, 124, 126, 128, and 130 may support software based on the UNIX, LINUX, or Windows operating systems. Nodes 118, 120, 122, 124, 126, 128, and 130 are further described with reference to FIG. 2.

Network 106 provides a communications infrastructure for exchanging messages. Network 106 may be implemented, for example, as a wide area network, a metropolitan area network, local area network, or combination of networks, such as the Internet. Network 106 may support a variety of protocols, such as the Internet Protocol, ATM, frame relay, or Ethernet.

Figure 2:
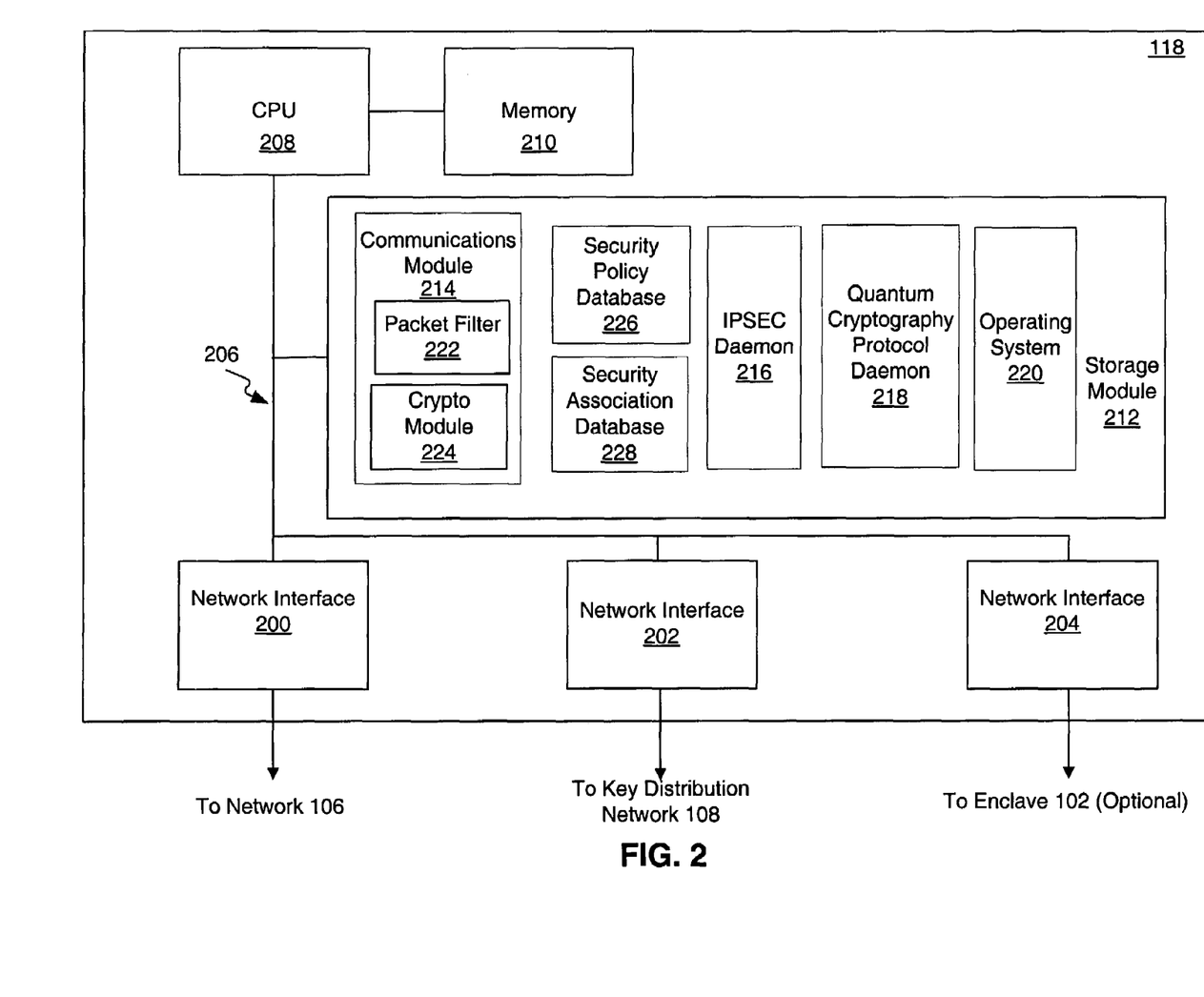
FIG. 2 illustrates a block diagram of a node consistent with the principles of the present invention.

FIG. 2 illustrates a block diagram of a node 118 (or nodes 120, 122, 124, 126, 128, and 130) consistent with the principles of the present invention. As shown, node 118 includes network interfaces 200, 202, 204, a bus 206, a central processing unit ("CPU") 208, a memory 210, and a storage module 212.

Network interfaces 200, 202, and 204 provide a communications interface between node 118, network 106, key distribution network 108, and private enclave 102, respectively. For example, network interface 200 is connected to link 134a to allow node 118 to communicate with network 106. Although network interface 200 is shown connected to one link, network interface 200 may be connected to multiple links to network 106.

Network interface 202 is connected to links 132a–b. As noted above, in one embodiment, links 132a–b are configured as quantum cryptographic links. Accordingly, network interface 202 may be implemented with known quantum cryptographic equipment, such as a laser emitting one or more light pulses at known wavelengths suitable for transmission through a fiber optic link, such as 1300 nm and 1550 nm, and a detector for receiving light pulses. Network interface 202 may also include other types of equipment, such as SONET equipment. In addition, network interface 202 may be implemented as a transmitter or receiver only.

Network interface 204 is connected to link 114 to allow node 118 to communicate with enclave 102. For example, network interface 204 may be implemented as an Ethernet interface.

Bus 206 provides a common connecting structure between the components of node 118, such as network interfaces 200, 202, and 204, CPU 208, and storage module 212. For example, in one embodiment bus 206 is a peripheral component interconnect ("PCI") bus.

CPU 208 performs the logic, computational, and decision-making functions for node 118. In addition, CPU 208 interprets and executes instructions in program code, for example, from memory 210 or storage module 212. Although FIG. 2 illustrates a single CPU 208, node 118 may alternatively include multiple CPUs. CPU 208 may also include, for example, one or more of the following: a co-processor, memory, registers, and other processing devices and systems as appropriate.

Memory 210 provides a primary memory for CPU 208, such as for program code. Memory 210 may be embodied with a variety of components of subsystems, including, a random access memory ("RAM"), and a read-only memory ("ROM"). For example, CPU 208 may download at least a portion of the program code contained in storage module 212 into memory 210. As CPU 208 executes the program code, CPU 208 may also retrieve additional portions of program code from storage module 212.

Figure 3:
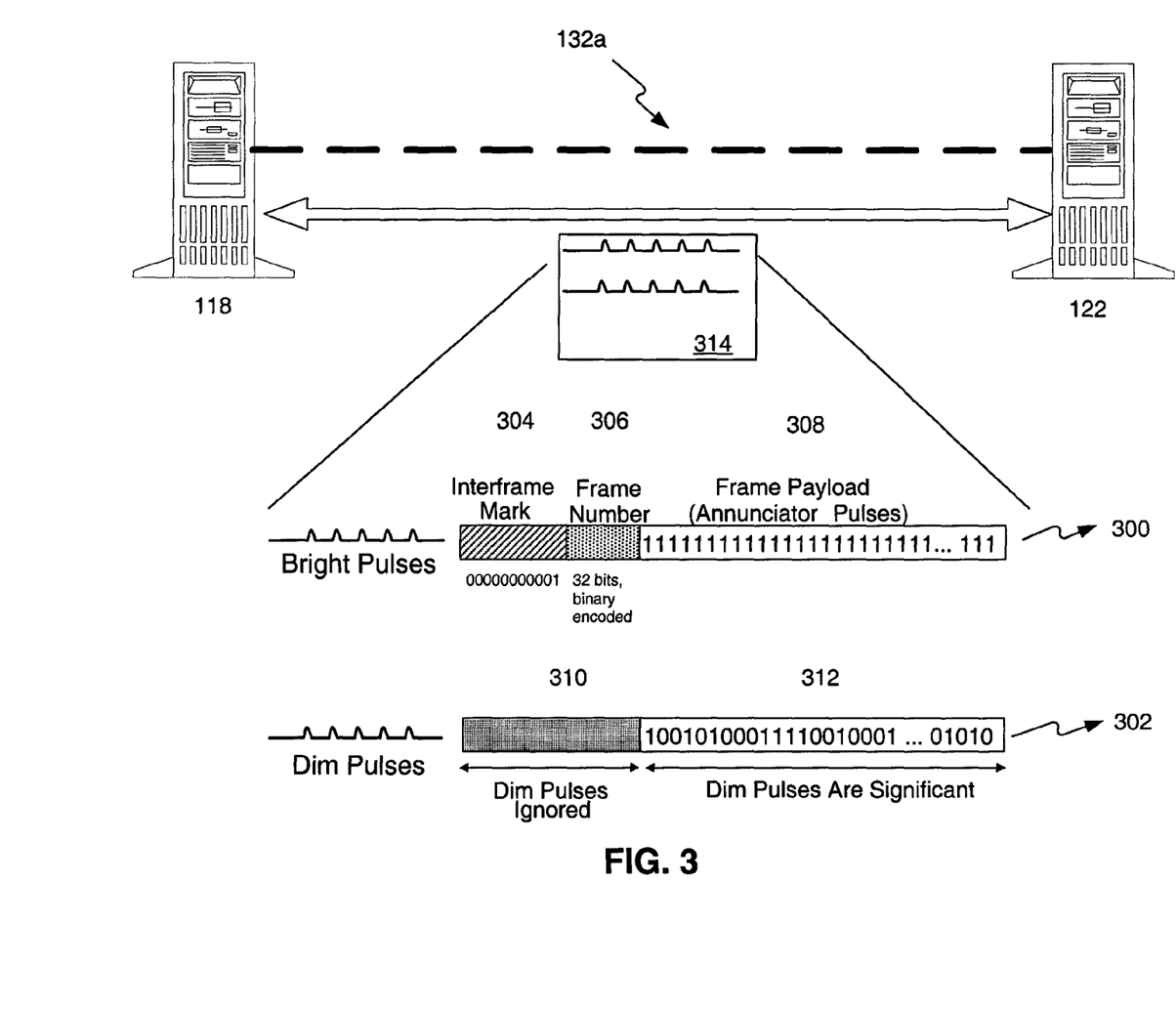
FIG. 3 illustrates an example of keying information or material exchanged between nodes in a key distribution network consistent with the principles of the present invention.

Storage module 212 provides mass storage for node 118 and may be embodied with a variety of components or subsystems including, for example, a hard drive, an optical drive, a general-purpose storage device, a removable storage device, and/or other devices capable of storing information. Storage module 212 is illustrated in FIG. 3 may also store and retrieve information and program code form other components external to node 118, such as a peripheral hard drive.

Storage module 212 includes program code, such as C or C++ code, and information for configuring node 118. As shown, storage module 212 may include program code for: a communications module 214, an IPSec daemon 216, a Quantum Cryptography Protocol ("QP") daemon 218, and an operating system 220.

Communications module 214 interprets and forwards communications between CPU 208 and network interfaces 200, 202, and 204. For example, in one embodiment, communications module 214 includes a packet filter 222 and a cryptography ("crypto") module 224. Communications module 214 also refers to a security policy database 226 and a security association database 228 to determine how to interpret and forward communications.

Packet filter 222 includes rules for determining whether to forward or discard communications, such as packets, from network interfaces 200 and 204. Packet filter 222 determines the rules based on information retrieved from security policy database 226 and security association database 228.

Cryptography module 224 includes key information or material, such as one or more keys, and executes the algorithms for encrypting or decrypting, for example, information in packets received from network 106 via network interface 200. Cryptography module 224 encrypts and decrypts information based on keys or key materials retrieved from IPSec daemon 216.

Security policy database 226 includes information indicating the rules that are applicable to a set of communications. Security association database 228 includes information indicating the set of services, such as encryption type and authentication, for a set of communications. In one embodiment, security policy database 226 and security association database 228 are configured in accordance with the known IPSec protocols.

IPSec daemon 216 provides instructions for implementing the security features associated with the IPSec protocol, such as tunneling, authentication, and key exchange. IPSec daemon 216 receives keys or key materials based on information processed by QP daemon 218. IPSec daemon 216 collects the keys or key materials from QP daemon 218 on a periodic or continuous basis and stores the keys or key materials in security association database 228.

QP daemon 218 provides instructions to determine keys based on implementing the protocols associated with quantum cryptography including known quantum cryptography protocols for sifting bits encoded as photons in pulses of light, error correction, privacy amplification, and authentication. QP daemon 218 receives "raw" keying information or material from network interface 202. QP daemon 218 then processes the raw keying information or material based on the quantum cryptography protocols to produce one or more keys or key materials. QP daemon 218 may then provide these keys or key materials to IPSec module 216.

Operating system 220 provides instructions for managing the basic operations, such as management of memory 210 and storage module 212, and information flow to and from CPU 208, of node 118. For example, operating system 220 may be the UNIX, LINUX, or Windows operating system.

FIG. 3 illustrates an example of keying information or material exchanged between nodes in a key distribution network consistent with the principles of the present invention. In particular, FIG. 3 illustrates information shared between nodes 118 and 122 through link 132a. Which is configured as a quantum cryptographic link.

As shown, nodes 118 and 122 exchange two sets of pulses 300 and 302 that are transmitted at known wavelengths for transmission through a fiber optic link. In one embodiment, pulses ("bright pulses") 300 are transmitted at a wavelength of 1300 nm and pulses ("dim pulses") 302 are transmitted at a wavelength of 1550 nm. Bright pulses 300 and dim pulses 302 are used in parallel to encode a frame 314 of quantum cryptographic information ("q-frame"). Interframe mark portion 304 of bright pulses 300 provides a marker for indicating the start of q-frame 314. In one embodiment, interframe mark portion 304 is encoded as binary string of "00000000001." Frame number portion 306 provides a number for identifying q-frame 314. In one embodiment, frame number portion 306 identifies q-frame 314 based on a 32-bit binary encoded number. During interframe mark portion 304 and frame number portion 306, nodes 118 and 122 ignore dim pulses 302 during interval 310.

Bright pulses 300 then include an annunciator portion 308 to indicate that dim pulses 302 should be processed as keying information or material. In one embodiment, annunciator portion 308 comprises a 1024-bit string of photons encoding a binary value of "1." During annunciator portion 308, dim pulses 302 are considered significant and nodes 118 and 122 read portion 312 as the payload of q-frame 314. Based on the bits encoded in portion 312, nodes 118 and 122 determines one or more keys including a respective pairwise key that is shared between node 118 and 122. Nodes 118 and 122 may then use these keys, for example, to encrypt portions of messages exchanged through network 106.

Figure 4:
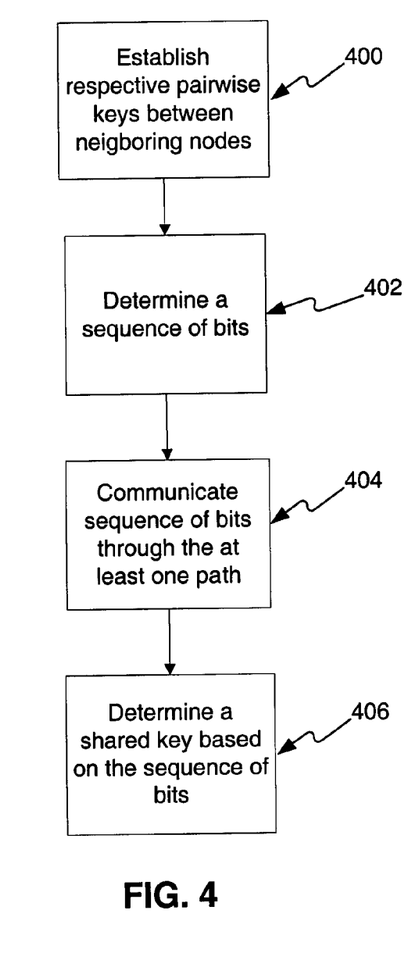
FIG. 4 illustrates a flow diagram of steps performed for establishing a key consistent with the principles of the present invention.

FIG. 4 illustrates a flow diagram of steps performed for establishing a key between nodes 118 and 120 consistent with the principles of the present invention. In stage 400, neighboring nodes establish respective keys. In particular, nodes 118, 120, 122, 124, 126, 128, and 130 each establish respective keys with their neighboring nodes. For example, node 118 establishes respective keys with nodes 122 and 128. Node 122 establishes respective keys with nodes 124 and 126 and so forth.

Nodes 118, 120, 122, 124, 126, 128, and 130 establish their respective keys based on key information or material exchanged through links 132a–j in key distribution network 108. For example, node 118 receives one or more q-frames, such as q-frame 314, via links 132a and 132b. Network interface 202 receives q-frame 314 and passes it to communications module 214 via bus 206. Communications module 214 is configured to recognize communications from network interface 202 based, for example, on information in security policy database 226 and security association database 228. Accordingly, communications module 214 passes q-frame 314 to QP daemon 218.

QP daemon 218 interprets the portions of q-frame 314 and retrieves the information from portion 312. As noted above, QP daemon 218 interprets q-frame 314 based on known quantum cryptographic protocols. QP daemon 218 then determines one or more keys from the information in portion 312 and passes these keys to IPSec daemon 216.

IPSec daemon 216 stores the keys within security association database 228. Security association database 228 also includes information identifying which nodes are associated with a particular key. For example, node 118 neighbors nodes 122 and 128. Accordingly, IPSec daemon 216 and security association database 228 will maintain corresponding keying information or material for both nodes 122 and 128.

As node 118 consumes keys or key materials, for example, over a period of time or after using a key to encrypt a threshold amount of data, IPSec module 216 may command crypto module 224 to retrieve one or more keys from security association database 228. Likewise, nodes 120, 122, 124, 126, 128, and 130 establish and accumulate keys in a manner similar to node 118 based on exchanging q-frames through links 132c–j, respectively.

In stage 402, a sequence of bits is determined. In particular, node 118 generates a sequence of bits. For example, node 118 may generate the sequence of bits using a random number generated by CPU 208. CPU 208 may generate random numbers for the sequence of bits based on a variety of known algorithms. Alternatively, CPU 208 may be coupled to a separate device that generates random numbers, for example, based on a physical process, such as thermal noise.

In stage 404, the sequence of bits is communicated through network 106 from node 118 to node 120. In particular, CPU 208 of node 118 provides the sequence of bits to communications module 214. Node 118 then determines at least one path through nodes 122, 124, 126, 128, and 130 to reach node 120. Node 118 may determine the at least one path based on a variety of algorithms. For example, node 118 may determine the at least one path by sending one or more setup messages through network 106. The setup messages may be sent by communications module 214 through network 106 to nodes 120, 122, 124, 126, 128, 130 using known protocols, such as the Constraint-Based Label Distribution Protocol or the Resource Reservation Protocol.

In response to the setup messages, nodes 122, 124, 126, 128, and 130 indicate whether they can establish the at least one path to node 120. For example, nodes 122, 124, 126, 128, and 130 may establish the path based on the shortest amount of "hops" or based on the level of security requested by node 118. Alternatively, various paths through nodes 118, 120, 122, 124, 126, 128, and 130 may be manually configured, for example, by a system administrator or service provider.

In addition, nodes 122, 124, 126, 128, and 130 may establish one or paths to route around a failure associated with one of the nodes, such as in links 134c–g or links 132a–j. A failure (or possible eavesdropper) in links 132a–j may be detected based on an interruption in receiving q-frames or an excessive amount of errors in the quantum state of photons conveyed through these links. A failure in links 134c–g may be indicated based, for example, on known routing protocols for network 106.

For example, a failure associated with node 124, may be routed around by establishing the path through nodes 126 and 130. Accordingly, nodes 122, 124, 126, 128, and 130 will indicate the appropriate nodes for the at least one path between node 118 and node 120.

Node 118 may request multiple paths through nodes 122, 124, 126, 128, and 130. The paths may be fully disjoint. For example, one path may traverse through nodes 122 and 124 while a second path may traverse through nodes 128 and 130. Alternatively, the paths may be partially disjoint and traverse at least one node in common. For example, one path may traverse through nodes 122 and 124 while a second path may traverse through node 122, 126, and 130.

As another alternative, nodes 122, 124, 126, 128, and 130 may determine the at least one path dynamically on a "per hop" basis. In other words, each node may make an independent routing decision for forwarding messages between nodes 118 and 120.

The sequence of bits is then communicated through network 106 by traversing through the nodes of the at least one path. For example, if the at least one path between nodes 118 and 120 traverses nodes 122 and 124, then node 118 combines the sequence of bits with the respective key that is shared with node 122. In one embodiment, communications module 214 determines the number of bits ("N") in the sequence of bits. Cryptographic module 224 then retrieves the key for node 122 and exclusive-ORs ("XOR") the first N bits of the key with the sequence of bits to produce a result.

Communications module 214 then encapsulates the result in a packet, cell, or frame to form a message that is suitable for transmission through network 106. Communications module 214 then forwards the message through network interface 200 and link 134a to network 106.

If multiple paths have been established or requested through nodes 122, 124, 126, 128, and 130, node 118 divides the sequence of bits into one or more portions, combines the portions with the appropriate keys for each of the neighboring nodes, and produces respective results for each portion. The results are then encapsulated in multiple messages, which are communicated along the multiple paths through network 106.

Network 106 then routes or switches the message to node 122 via link 134c. Node 122 receives the message and identifies the encapsulated result. For example, node 122 may recognize the message and that it includes an encapsulated result based on matching information received from an earlier setup messages with information included in the message, such as a source address or port number. Node 122 then identifies (or decrypts) the sequence of bits from the result by combining the result with the key that is shared between nodes 118 and 122. For example, node 122 may decrypt the sequence of bits by XOR-ing the result with the key that is shared between nodes 118 and 122.

Node 122 then determines the next destination for the sequence of bits, e.g., node 124. Accordingly, node 122 retrieves the key that is shared between nodes 122 and 124, encrypt the sequence of bits based on that key to form a second result, and forward a second message to network 106 via link 134c.

Network 106 routes or switches the second message to node 124 via link 134d. Node 124 identifies the second result in the second message. Node 124 then identifies (or decrypts) the sequence of bits by combining the second result with the key that is shared between nodes 122 and 124. As noted, in one embodiment, node 124 decrypts the sequence of bits using an XOR operation.

Node 124 then determines the next destination for the sequence of bits, e.g., node 120. Accordingly, node 124 retrieves the key that is shared between nodes 124 and 120, encrypt the sequence of bits based on that key to form a third result, and forward a third message to network 106 via link 134c.

Network 106 routes or switches the third message to node 120 via link 134b. Node 120 then identifies (or decrypts) the sequence of bits by combining the third result with the key that is shared between nodes 124 and 120. As noted, in one embodiment, node 120 decrypts the sequence of bits using an XOR operation.

In stage 406, upon identifying the sequence of bits, node 120 determines or selects at least a portion of the sequence of bits to be used as one or more keys or key material that is shared between nodes 118 and 120. Node 120 may use known protocols for determining or selecting the key from the sequence of bits. Node 120 may then send a message to node 118 through network 106 indicating, for example, which bits were selected as the shared key. This message may include the actual key that is shared between nodes 118 and 120, or may include information that indirectly indicates the key. Alternatively, nodes 118 and 120 may simultaneously determine or select a shared key from the sequence of bits based on known protocols for key management and distribution without exchanging messages through network 106.

Nodes 118 and 120 may then use the shared key to encrypt communications routed or switched through network 106. For example, nodes 118 and 120 may use the shared key to encrypt information in an IPSec tunnel established through network 106. Other uses and applications of the shared key are also consistent with the principles of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of establishing a key using a plurality of nodes, wherein each node is coupled to a first network and a second network, and wherein nodes that neighbor each other in the second network establish respective keys, said method comprising:
   determining a sequence of bits at a first node;
   subsequent to the establishment of the respective keys between neighboring nodes in the second network, communicating the sequence of bits through the first network to a second node along at least one path traversing a set of the plurality of nodes based on the respective keys established for the nodes in the set;
   and determining a key that is shared between the first node and the second node based on the sequence of bits, wherein the second network substantially maintains a quantum state of photons in light information conveyed between neighboring nodes.

2. The method of claim 1, wherein determining the sequence of bits at the first node comprises determining a random sequence of bits.

3. The method of claim 1, wherein communicating the sequence of bits through the first network, comprises:
   identifying a first respective key previously established between the first node and a third node that neighbors the first node along the at least one path;
   combining the sequence of bits with at least a portion of the first respective keys to form a result; and
   sending the result from the first node to the third node.

4. The method of claim 3, wherein communicating the sequence of bits through the first network, comprises:
   identifying the sequence of bits at the third node based on the first respective key;
   determining a next node that neighbors the third node along the at least one path;
   identifying a second respective key previously established between the third node and the next node;
   combining the sequence of bits with at least a portion of the second respective key to form a second result; and
   sending the second result to the next node through the first network.

5. The method of claim 1, wherein communicating the sequence of bits through the first network, comprises:
   receiving a message from a third node along the at least one path that neighbors the second node; identifying a respective key established between the third node and the second node; and identifying the sequence of bits in the message based in the respective key.

6. The method of claim 5, wherein determining the key that is shared between the first node and the second node, comprises:
   selecting at least a portion of the sequence of bits;
   determining the key that is shared between the first node and the second node based on the selected portion; and
   and sending information indicating the selected portion from the second node to the first node through the first network.

7. The method of claim 1, wherein communicating the sequence of bits through the first network, comprises:
   dividing the sequence of bits into portions; and communicating the portions through the first network along different paths through the set of nodes.

8. The method of claim 7, wherein communicating the portions through the first network along different paths comprises communicating the portions along disjoint paths through the set of nodes.

9. The method of claim 7, wherein communicating the portions through the first network along different paths comprises communicating the portions along different paths that traverse at least one node that is common to at least some of the different paths.

10. The method of claim 1, wherein communicating the sequence of bits through the first network, comprises:
    determining an event along the at least one path based on information exchanged between the set of nodes through the second network;
    determining at least one additional path that circumvents the event;
    communicating the sequence of bits through the first network along the at least one additional path.

11. A system for establishing a key using a plurality of nodes, wherein each node is coupled to a first network and a second network, and wherein nodes that neighbor each other in the second network establish respective keys, said system comprising:

means for determining a sequence of bits at a first node;

means for, subsequent to the establishment of the respective keys between neighboring nodes in the second network, communicating the sequence of bits through the first network to a second node along at least one path traversing a set of the plurality of nodes based on the respective keys established for the nodes in the set; and means for determining a key that is shared between the first node and the second node based on the sequence of bits, wherein the second network substantially maintains a quantum state of photons in light information conveyed between neighboring nodes in the second network.

12. A node comprising:

a first interface coupled to a first network; a second interface coupled to at least one additional node coupled to a second network; and a processor configured to determine a first key that is shared with at least one additional node based on information exchanged through the second interface over the second network, determine a sequence of bits, determine a result based on combining the sequence of bits with at least a portion of the first key, send the result in a message to the additional node through the first network via the first interface, and determine a second key that is shared with a second node based on the sequence of bits, wherein the second network substantially maintains a quantum state of photons in light information conveyed between the at least one additional node and the first node.

13. The node of claim 12, wherein the first interface is coupled to a first network that is public.

14. The node of claim 13, wherein the processor is configured to determine the first key based on the quantum of the photons in light information conveyed between the additional node and the first node.

15. The node of claim 12, further comprising: a third interface coupled to a device.

16. The node of claim 12, further comprising: a third interface coupled to at least one additional network.

17. The node of claim 12, wherein the processor is configured to receive information destined for the second node, encrypt the information based on the second key, and send the encrypted information through the first network to the second node.

18. A node, comprising:

a first interface coupled to a first network;

a second interface coupled to a first neighboring node;

a third interface coupled to a second neighboring node; and a processor configured to establish respective keys shared with the first neighboring node and second neighboring node over a second network via the second and third interfaces, subsequent to establishing the respective keys, receive a first message that is routed from the first neighboring node through the first network, identify a sequence of bits in the first message based in the respective key shared with the first neighboring node, identify whether the sequence of bits is to be used for a key shared between a set of other nodes coupled to the first network, determine a result based on combining the sequence of bits with at least a portion of the respective key shared with the second neighboring node, and forward the result in a second message that is routed through the first network to the second neighboring node, wherein the second network substantially maintains a quantum state of photons in light information conveyed between the first neighboring node and the second neighboring node.

19. The node of claim 18, wherein the processor is configured to establish the respective key shared with the first neighboring node based on light information conveyed between the first neighboring node and the node through the second interface.

20. A system for distributing a sequence of bits to be used as a key that is shared between a first node and a second node, comprising:

a first network for exchanging messages;

a second network for exchanging keys; and a set of nodes coupled to the first network and the second network, wherein nodes that neighbor each other in the second network establish respective keys and wherein the nodes are configured to communicate the sequence of bits from the first node to the second node through the first network based on the respective keys established through the second network, wherein the second network substantially maintains a quantum state of photons in light information conveyed between nodes that neighbor each other in the second network.

21. The system of claim 20, wherein the sequence of bits are communicated along at least one path traversing the set of nodes.

22. The system of claim 21, wherein the at least one path comprises disjoint paths traversing through the set of nodes.

23. The system of claim 21, wherein the at least one path comprises different paths that traverse at least one common node in the set of nodes.

* * * * *

UNITED STATES PATENT AND TRADEMARK OFFICE
CERTIFICATE OF CORRECTION

| | | |
|---|---|---|
| PATENT NO. | : 7,236,597 B2 | Page 1 of 1 |
| APPLICATION NO. | : 10/324040 | |
| DATED | : June 26, 2007 | |
| INVENTOR(S) | : Elliott et al. | |

It is certified that error appears in the above-identified patent and that said Letters Patent is hereby corrected as shown below:

Column 12, line 42, please delete the word "and"

Signed and Sealed this

Twenty-first Day of August, 2007

JON W. DUDAS
*Director of the United States Patent and Trademark Office*